Patented Aug. 25, 1925.

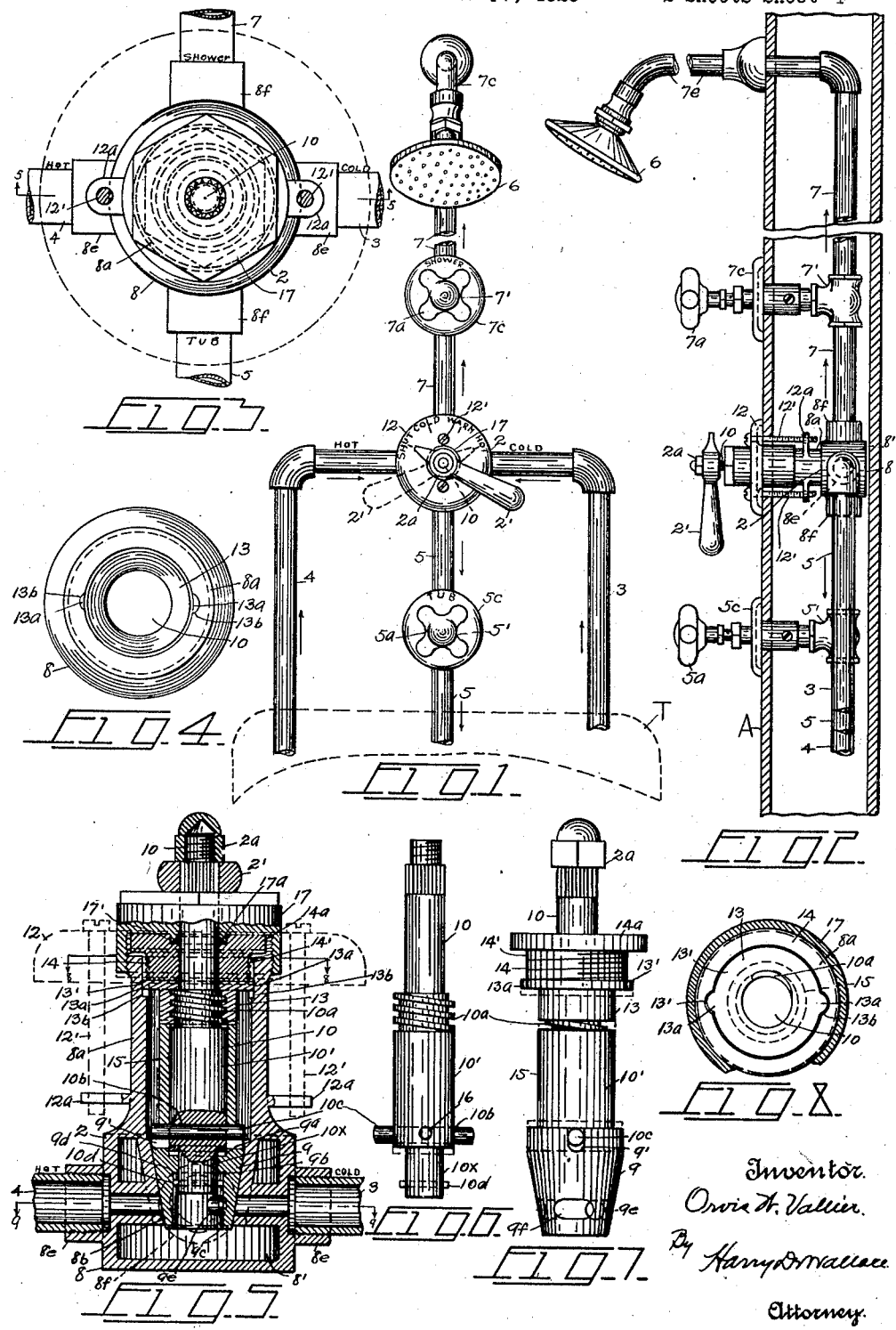

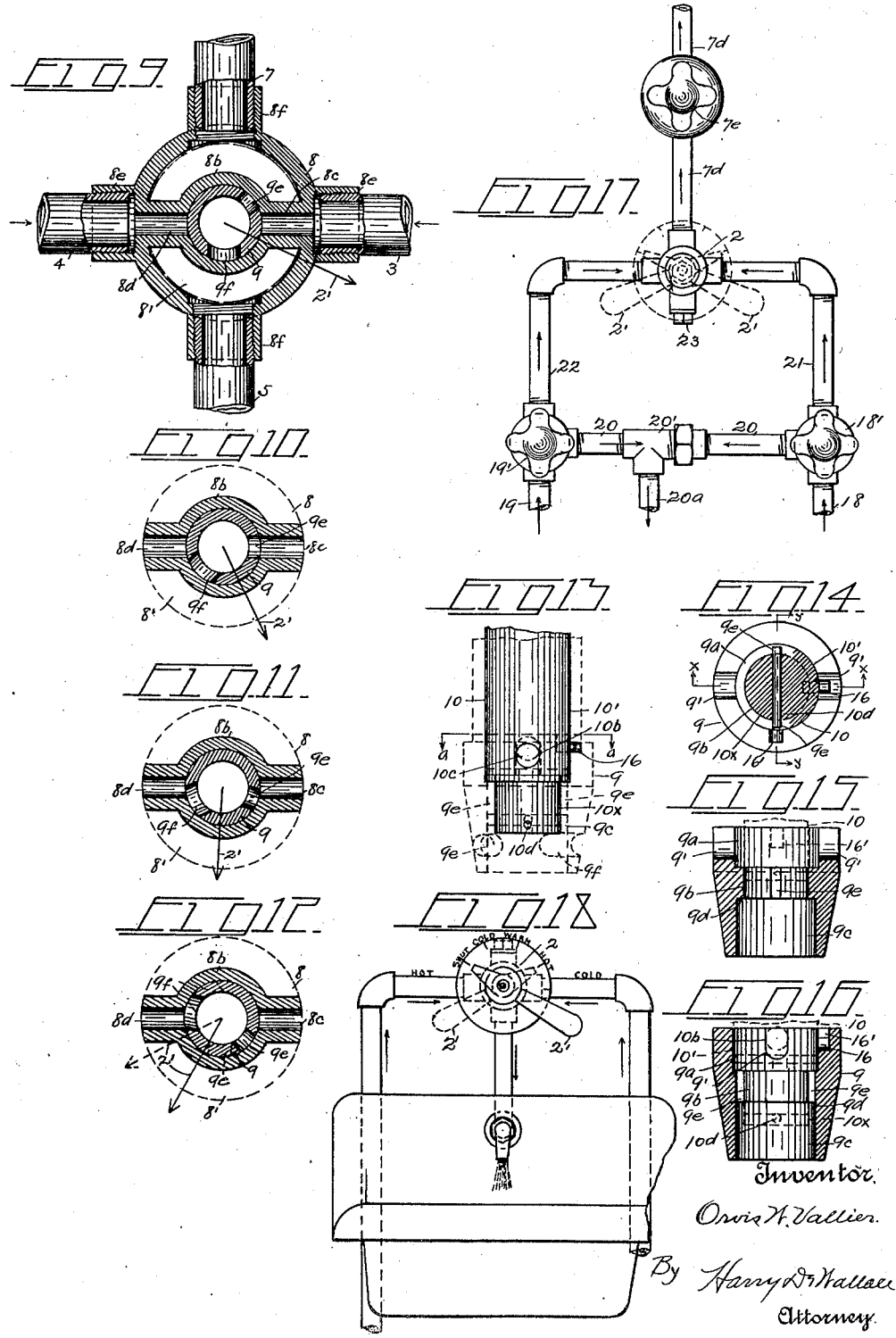

1,551,226

UNITED STATES PATENT OFFICE.

ORVIS W. VALLIER, OF WATERTOWN, NEW YORK, ASSIGNOR TO J. B. WISE INCORPORATED, OF WATERTOWN, NEW YORK, A CORPORATION OF NEW YORK.

MIXING VALVE FOR TUB AND SHOWER BATHS.

Application filed January 14, 1925. Serial No. 2,346.

*To all whom it may concern:*

Be it known that I, ORVIS W. VALLIER, a citizen of the United States, residing at Watertown, in the county of Jefferson and State of New York, have invented certain new and useful Improvements in Mixing Valves for Tub and Shower Baths, of which the following is a specification.

This invention relates to means for controlling the mixing and supplying of water at various temperatures to tub and shower baths, lavatories, sinks and the like, and has for its object to provide a novel and simple mixing-valve, with which may be associated shut-off valves and other selective means of ordinary construction. A further object is to provide a mixing-valve which may be located in a single line of piping that leads directly from the valve to the bath-tub, as well as to the shower-head, whereby cold, warm and hot water may be supplied to either the tub or the shower-head at will, by means of a single controlling member. A further object is to provide novel adjustable means for controlling the opening and closing of the mixing-valve, as well as means for taking up looseness and stopping leaks occasioned by the wearing of the valve or valve seat. A particular object of the invention is to provide a mixing-valve that takes the place and performs the work of the separate hot and cold water cocks which comprise the ordinary bath-tub supply fittings and which require frequent packing for preventing leaking. And a further object is to generally improve and simplify the construction, arrangement and operation of mixing-valves of this class.

The various features and parts of the invention will be understood from the detailed description which follows, and by reference to the accompanying drawings, in which—

Figure 1 is a broken front elevation of the 4-way mixing-valve and the inlet and outlet pipes. Fig. 2 is a right-side elevation of the said parts, in connection with a hollow wall. Fig. 3 is an enlarged top plan-view of the mixing-valve with the dial and pointer removed. Fig. 4 is a top-end view of the valve-body with the screw-cap removed. Fig. 5 is a vertical cross-section taken on line 5—5 of Fig. 3. Fig. 6 is an elevational view of the valve-stem. Fig. 7 is a similar view of the valve stem, the valve, and certain of the adjusting parts. Fig. 8 is a horizontal section, taken on line 8—8 of Fig. 5. Fig. 9 is a horizontal section, taken on line 9—9 of Fig. 5; showing the position of the mixing-valve when it is shut-off. Fig. 10 is a similar but fragmentary view; showing the valve set for supplying cold water to either the tub or the shower-head. Fig. 11 is a similar view; showing the valve in position to mix and supply the hot and cold water. Fig. 12 is a similar view; showing by the full lines, the position of the valve for supplying only hot water; the dotted lines showing the further movement of the valve in the same direction, for shutting off the hot water. Fig. 13 is a broken view of the valve-stem; showing the operative position in relation to the valve. Fig. 14 is a top-end view of the valve, and horizontal sectional view of the valve-stem, taken on line $a$—$a$ of Fig. 13; showing the first step in the assembling of the parts. Fig. 15 is a central vertical section on line $x$—$x$ of Fig. 14. Fig. 16 is a central vertical section taken on line $y$—$y$ of Fig. 14. Fig. 17 is a front face diagram of a modified system; showing a 3-way mixing-valve for supplying water to the shower-head alone. And Fig. 18 is a view of a sink or lavatory to which the mixing-valve is connected.

In the drawings, Figs. 1 and 2 illustrate a combination tub and shower bath water-supply system, in which 2 represents generally the mixing-valve, which receives the cold and hot water respectively through plain valveless pipes 3 and 4, and dispenses cold, warm or hot water towards the bath-tub T, by a branch pipe 5, and to the shower-head 6, by means of a similar branch pipe 7. The said branches together with the mixing-valve comprising a direct aligning conductor of simple construction. The water supplied to the bath-tub, as well as to the shower-head is selectively controlled by means of cocks 5' and 7'. According to the drawings, the pipes 3, 4, 5 and 7, as well as the cocks 5' and 7' and the main portion of the mixing-valve 2, are all disposed within a hollow wall, as A, so that only the operating handles, as 2', 5ᵃ and 7ᵃ are exposed. The top-end of pipe 7 is provided with an extension 7ᵉ, which projects into the bathroom and supports the shower-head 6, as shown in Figs. 1 and 2. The pipes 3 and 4 may receive the cold and hot water from any suitable source, but according to the drawings (excepting Figs. 17 and 18), the pipes 3 and 4 communicate with the bath-tub and shower-head only by means of the 4-way mixing valve 2.

The mixing-valve 2, comprises a hollow body having a relatively large cylindrical base 8, in which is located the mixing chamber 8'. Concentric to the base 8 is arranged a relatively long integral hollow neck $8^a$, in which the mixing-valve and related parts are operatively disposed. The valve chamber proper comprises a funnel-shaped portion $8^b$, which is arranged concentric to the chamber 8' and the neck $8^a$, and has an open bottom that communicates with the said chamber. The opposite walls of the part $8^b$ are provided with aligning radial ports or openings $8^c$—$8^d$ which communicate respectively with the cold and hot water supply pipes 3 and 4, the said pipes being screwed into corresponding hollow radial bosses $8^e$, which may be integral with the base 8. The base 8 is also formed with similar radial bosses $8^f$, arranged at right angles to the bosses $8^e$, and into which are screwed outlet or branch pipes 5 and 7, both of which communicate directly with the mixing chamber 8'.

The mixing-valve proper comprises a hollow body 9, preferably made of a non-metallic substance, as "fibreloide", which tapers to correspond to the seat in chamber $8^b$, the said valve being rotatable by means of a stem 10, whose reduced lower end $10^x$ loosely telescopes the valve, and is adjustably interlocked thereto. The stem 10 thence extends outwardly through and projects some distance beyond the free end of the neck $8^a$, the threaded exposed end of the stem being fitted with the pointer-handle 2', which is held in place by a nut $2^a$ (see Figs. 1, 2, 5 and 7). Intermediate its ends the stem 10 is enlarged, as at 10', and immediately above said portion the stem is preferably formed with left-hand threads $10^a$, while its lower enlarged portion is bored transversely, as at $10^b$ to receive a pin $10^c$, by which the valve 9 is driven. The expanded top-end of the valve is formed with a smaller bore $9^b$, which receives and guides the reduced lower end portion $10^x$ of the stem, this contracted portion being formed with oppositely facing longitudinal slots or ways $9^e$ (see Figs. 14, 15 and 16), for facilitating the assembling of the stem and valve. The lower end of the stem is perforated transversely to receive a pin $10^d$, which prevents the accidental release of the stem from the valve when the said parts are in the operative position, shown in Fig. 1. Below the choke-bore $9^b$ the valve body is again bored out, as at $9^c$, to correspond to the top opening $9^a$. This lower enlargement affords freedom for the pin $10^d$, and also provides a positive shoulder $9^d$ for arresting the upward movement of the stem. The chamber $9^c$ is where the hot and cold water are initially mixed before they are discharged through the open bottom of the valve 9 into the larger mixing chamber 8'. The cold water may only flow through the port or duct $8^c$ into the chamber $9^c$, by means of a radial port $9^e$, this latter port is preferably round and substantially the same diameter as the duct $8^c$. The hot water flows from the duct $8^d$ through an elongated port $9^f$ of the valve. This latter port (see Fig. 10) is so positioned that it remains closed while the cold water port $9^e$ is in registry with the passage $8^e$ but is arranged to be partially opened by the partial closing of the port $9^e$, for supplying a mixture of cold and hot water, as shown in Fig. 11. The cold water may be shut off entirely, while the hot water port is still open, for raising the temperature of the water either at the bath-tub, or at the shower-head, by the further rotation of the valve 9, as to the position shown by the full lines in Fig. 12. The dotted lines in Fig. 12 show the positioning of the valve 9 for entirely shutting off the hot water supply.

The mixing-valve 2 is provided with a dial comprising an escutcheon-like plate 12, which is usually disposed against the wall A, above the head-end of the bath tub, the said plate being secured to the valve body and held in place against the wall by means of bolts 12' which pass through the dial and are screwed into integral lugs $12^a$, which project from the opposite sides of the neck $8^a$. The pointer-handle 2' is positioned to sweep the dial 12, and the latter preferably bears the following markings: "Shut", "Cold", "Warm" and "Hot", for indicating the progressive movements of the pointer, and the corresponding closed and dispensing position of the valve 9, as shown in Fig. 1, and by the long arrows in Figs. 9, 10, 11 and 12.

The cocks 5'—7' may be of any ordinary style or make, and are not shown in detail. These cocks are preferably disposed in the single supply pipe comprising sections 5 and 7, which extends downwardly towards the bath tub, as well as upwardly toward the shower-head, as shown in Fig. 1. The handles $5^a$ and $7^a$ of the two cocks are disposed concentric to and project beyond escutcheons $5^c$ and $7^c$, which normally rest against the wall A, within easy reach of the users of the baths. In the present showing the cold and hot water pipes 3 and 4 are controlled entirely by the valve 9, thereby eliminating the usual cocks and other controlling means.

The rotary movements of the valve 9 are regulated by a nut 13, which is preferably provided with left-hand threads corresponding to the threading of the valve stem 10, and also with an annular flange 13', the latter being formed with oppositely facing peripheral projections 13$^a$, which engage and play in grooves or ways 13$^b$, the latter being formed longitudinally in the walls of the neck 8$^a$, as shown in Figs. 5 and 8. By this construction and arrangement, the nut 13 is held from rotation with the stem, while being allowed a certain movement axially in the neck, for controlling the rotation of the stem. The movements of the nut 13 relatively to the stem and neck are controlled by an adjusting member 14, which is arranged with a reduced threaded portion 14′ which screws into the internally threaded free end of the neck as shown in Fig. 5. The member 14 is bored out centrally to receive and guide the outer reduced end of the stem 10, and is provided with a flange 14$^a$, which is arranged to overlap the end of the neck, and by which its adjustment is limited. When assembling the mixing-device 2, as shown in Fig. 5, the stem 10, together with the valve 9, a sleeve 15, and the nut 13 are inserted downwardly through the neck 8$^a$, until the valve becomes seated in the portion 8$^b$. The member 14 is next applied to the stem and screwed into the neck, until it fairly engages the top flange-face of the nut 13. The adjustor then unscrews the member 14 sufficiently to allow the stem and related parts to be rotated to the extent necessary to open and then to move the valve 9 step-by-step, for supplying the bath-tub or shower-head with cold, warm, or hot water, as shown in Figs. 9 to 12 inclusive. When the proper range of rotary movement of the valve 9 is thus effected, the member 14 is left in the adjusted position until the valve becomes loose or leaky due to wear and use. The valve 9 may be readjusted—loosened or tightened up, at any time by simply adjusting the member 14. When the valve 9 is in the "Shut" position, shown in Figs. 5 and 9, the barrel of the nut 13 rests firmly upon the top end of the sleeve 15, which is disposed loosely on the stem 10, between its threaded portion and the pin 10$^c$. This latter position corresponds to the full line position of the handle 2′ in Figs. 1, 17 and 18. When, however, the stem 10 is rotated clockwise, for supplying water to the several baths, the nut 13 being held from rotation, as explained, the stem is moved bodily, by reason of the left-hand threads, away from the valve to the extent allowed by the adjusting member 14. After the member 14 is properly adjusted, as explained, a cap 17 is screwed on to the externally threaded free end of the neck 8$^a$, for concealing and protecting the said member. The cap is bored out to loosely receive the free end of the stem 10, and the said cap loosely extends through the dial 12 and serves to hold the said parts concentric, as shown. The cap 17 is long enough to extend through walls of varying thickness without cramping or disfiguring the fixture, and its exposed end is provided with a hexagon portion, to receive a wrench for applying and removing the cap. The inner face of the cap 17 is formed with a hollow hub 17′ which is received in a corresponding socket 14$^a$ of the nut 14 for holding the parts in alignment, as well as for providing means for packing (see 17$^a$) the otherwise loose joints between the stem 10 and the parts 14 and 17 for preventing the escape of water that might leak upwardly through the neck 8$^a$ (see Fig. 5).

The pointer 2′ is arranged with a fluted opening to receive a correspondingly fluted portion of the stem 10, as shown in Figs. 5, 6 and 7. By this means, the pointer may be readily and positively set at the proper angle relatively to the dial 12, for effecting the opening and closing of the dispensing ports of the valve 9, as described.

As a further guide for the proper positioning of valve 9 and related parts relatively to the water inlet ports 8$^e$—8$^f$, the stem 10 must be applied to the valve in a certain manner. To do this, the naked stem with the pin 10$^d$, but without the pin 10$^c$, (see Fig. 6) is first inserted downwardly into the opening 9$^a$ of the valve, as shown in Fig. 14, in which the pin 10$^d$ is brought into registery with and is passed downwardly through the guide-slots 9$^e$. When the pin 10$^d$ sinks below the shoulder 9$^d$, the stem should be rotated a quarter-turn, as to the position shown in Fig. 5, and by the dotted positions shown in Figs. 15 and 16. This brings the perforation 10$^b$ of the stem into registery with the slot 9′, and allows the insertion of the pin 10$^c$, which holds the stem and valve in the operative position, shown in Figs. 5, 7, 13 and 16. The stem and the valve are usually locked in the last described position by means of a pin or stud 16, which projects from the body of the stem, at right angles to the pin 10$^c$, and which when the parts are finally assembled for operation, is received in a seat or socket 16′ that is formed in the top end of the valve 9, as shown in Figs. 13, 15 and 16. The several pins 10$^c$—10$^d$—16′ all loosely engage the valve 9, so that the valve and stem may at all times adjust themselves to the seat and other guides and supports without cramping the parts. The sleeve 15 normally bears or rides upon the pins 10$^c$ and 16, and tends to take the thrust of the nut 13, when the latter moves towards the valve. The depth of the slot 9′ is greater than the diameter of the pin 10$^c$, and the portion 10$^x$ of the stem above the pin 10$^d$ is also longer than the contracted medial portion of the valve body, for the purpose of facilitating the adjustments of the parts, for effecting the proper seating, as well as for taking up wear of the valve. The valve 9 is so constructed and arranged that it requires no gaskets or other packing, and as the initial loosening of the nut 13, at the start of each mixing operation, tends to relax the tension or pressure of the valve against the seat 8ᵇ, effected by the final closing movement when the pointer is swung around to the "Shut" position, there is very little wearing friction to contend with during long intervals of use.

Fig. 17, shows the application of the 4-way mixing valve 2 to an installation of the old style bath supply fittings, in which the cold water is supplied by a pipe 18 to a cock 18', the hot water being supplied by a pipe 19 to a cock 19'. The cocks 18' and 19' are shown connected by a cross-pipe 20 and a T, as 20', from which a pipe 20ᵃ carries the water at different temperatures towards the bath tub (not shown). According to this modified view, the mixing-valve receives the cold and hot water from the cocks 18'—19', by pipes 21 and 22, and then dispenses the water at different temperatures towards the shower-head (not shown), by means of a branch conduit, as 7ᵈ, the latter pipe being fitted with a shut-off cock 7ᵉ, corresponding to the cock 7'. In view of the old installation shown for the bath supply, the lowermost opening or way of the mixing-valve not being needed, is closed by a plug 23. By this arrangement but one size and style of mixing valve casing need be provided for different uses.

Obviously my improved mixing-valve may be used in connection with sinks, lavatories, and all fixtures, by which both hot and cold water are dispensed, as shown in Fig. 18. By such use, I am able to eliminate all ordinary cocks or valves, in which rubber and other packings are employed. The substitution of the mixing-valve also reduces the number of valves in all of the systems herein referred to, and greatly lessens the labor and cost of maintaining the water supply in perfect working order.

Having thus described my invention, what I claim, is—

1. The combination with a bath-tub and a shower head and separate sources of cold and hot water, of a conduit extending between the tub and shower head comprising aligning branches, and a hollow mixing valve for supplying water at different temperatures to said branches simultaneously, said valve having an open end and its interior being in constant communication with said branches and having separate radial ports adapted to receive the cold and hot water from said sources.

2. The combination with a bath-tub and a shower head, of a conduit extending between the tub and shower head comprising aligning sections, a hollow mixing valve for supplying water at different temperatures to the tub and shower head simultaneously said valve being disposed between and its interior being in constant communication with said sections, independent pipes for conducting hot and cold water to the opposite sides of said valve, and means for manually operating the valve.

3. The combination with a bath-tub and a shower head, of a water conductor connecting said parts, a 4-way valve casing interposed between the tub and shower head and having a common chamber freely communicating with portions of said conductor extending above and below the casing, a hollow valve rotatable in said casing having an opening freely communicating with said chamber, said valve having radial ports of different size, a pipe for supplying cold water to the smaller port of said valve, a pipe for supplying hot water to the larger port of said valve, and a handle for manipulating said valve.

4. The combination with a bath tub and a shower-head, of a pipe for conducting water to said parts, said pipe comprising similar vertical aligning branches, a 4-way valve interposed between said branches adapted to simultaneously supply water at different temperatures to said branches, means carried by each branch for stopping the flow of water therethrough, cold and hot water supply pipes communicating with the opposite lateral sides of said valve, a dial bearing markings indicating different dispensing positions of said valve, and a handle for rotating said valve, said handle being arranged to sweep said dial and to be moved relatively to said markings, for supplying cold, warm or hot water to said tub and shower-head.

5. In a tub and shower-bath combination, a common conductor adapted to supply water to said parts, said conductor comprising similar branches disposed in line vertically, a cock disposed in each branch for controlling the flow of water therethrough, a 4-way valve interposed between said branches, said valve having a common chamber that communicates with said branches, cold and hot water supply pipes communicating with the opposite lateral sides of said valve, means for manually operating said valve for dispensing water towards said branches at different temperatures simultaneously, and means for indicating the different movements of said valve.

6. In a tub and shower bath combination, a common conduit connecting the tub and the shower-head, a 4-way valve having a mixing chamber communicating with said conduit, and having separate cold and hot water inlet ports, said valve having a receiving chamber in which the cold and hot waters commingle before being discharged into the said mixing chamber, a stem for rotating said valve, a reciprocating nut threaded to said stem adapted to gage the rotary movements of the stem and valve, means for controlling the movement of said nut relatively to said stem, and means for manually operating said stem.

7. A mixing-valve for tub and shower baths, comprising a 4-way valve body having aligning cold and hot water inlet ports, and also aligning outlet ports by which water at different temperatures may be delivered directly to the tub and shower-head, said body having a valve chamber and a concentric mixing chamber adapted to receive the water dispensed by the valve and to discharge the water towards the tub and shower-head simultaneously, a stem for rotating the valve, a nut carried by said stem adapted to control the rotation thereof, means for limiting the axial movement of said nut, and a handle for rotating said stem.

8. A mixing-valve for tub and shower baths, comprising a valve body having aligning cold and hot water inlet openings, and having aligning water outlet openings communicating with a common mixing chamber, a hollow valve rotatable in said valve chamber said valve having ports adapted to register with the cold and hot water inlet openings when said valve is rotated step-by-step for supplying said mixing chamber with cold, warm, or hot water, for transmission to the tub and shower-head, a stem adjustably connected to said valve, a reciprocating nut threaded to said stem for controlling the rotary movements of the stem and valve, an adjusing member adapted to limit the axial movements of said nut, a dial for indicating the dispensing positions of said valve, and a pointer carried by said stem adapted to sweep said dial.

9. In a tub and shower bath combination including a common conduit adapted to supply water to the tub and shower-head, a water mixing device comprising a hollow body having a common mixing chamber that communicates with said conduit, and having aligning radial cold and hot water inlet openings, and a valve chamber projecting into the mixing chamber and communicating therewith, said valve chamber communicating with the inlet openings, a hollow valve in said valve chamber having ports that are adapted to register respectively with the cold and hot water inlet openings when said valve is rotated in opposite directions, a stem for operating said valve, a non-rotatable nut threaded to said stem adapted to control the rotary movements of the valve, a sleeve interposed between said nut and said valve adapted to absorb the thrust of said nut when the stem is reversed for closing the valve, a threaded member carried by said body adapted to limit the axial movements of said nut, a pointer for manually operating said valve, and a dial swept by said pointer adapted to indicate the step-by-step movements of the valve.

10. In a tub and shower bath combination including a single conduit for supplying water to the tub and shower-head, a water mixing device disposed in the line of said conduit adapted to supply water at different temperatures to the tub and shower-head, said mixing device comprising a hollow body having a common mixing chamber in constant communication with said conduit, and having a concentric valve chamber communicating with the mixing chamber, said body being formed with aligning radial cold and hot water inlet openings that communicate with said valve chamber, a valve rotatable in said valve chamber, said valve having a cavity facing the mixing chamber and having ports radiating from said cavity adapted to register respectively with the cold and hot water inlet openings, when the valve is rotated step-by-step in opposite directions, means for manually operating said valve, means for indicating the position of the valve relatively to the inlet openings at each step-by-step movement thereof, and means adjustable axially relatively to the stem for controlling the rotary movements of the valve in the opposite directions.

11. The combination of a bath tub and a shower-head, of a conduit extending between the tub and the shower-head, comprising aligning branches, a valve body having a mixing chamber communicating with the said branches, said body having separate cold and hot water inlet openings that communicate with the valve chamber, a valve rotatable in the valve chamber having radial ports adapted to be brought into registery with said inlet openings by the step-by-step movements of the valve, a stem for operating said valve, a handle for rotating said stem, a dial swept by said handle and indicating the closed as well as the dispensing positions of the valve, an adjusting member threaded into the body, a sleeve mounted on the stem below the adjusting member, and a nut threaded to said stem between said adjusting member and said sleeve for positively stopping said valve when it reaches the closed positions at the extremes of its rotary movements.

12. The combination with a bath tub, a shower-head, and a common conduit, said conduit comprising aligning branches, a mixing device interposed between said branches comprising a hollow body formed with a mixing chamber that is in constant communication with said branches, said body being formed with a valve chamber that communicates with the mixing chamber, said valve chamber having oppositely facing radial ports for the inlet of cold and hot water, a hollow valve rotatable in said valve chamber having ports adapted to be brought into registry with the cold and hot water inlets when the valve is rotated step-by-step in opposite directions, a stem for operating said valve, a portion of said stem being formed with left-hand threads, a member threaded into said body concentric to the stem, a nut engaging the threads of said stem adapted to be reciprocated towards and away from said member by the rotation of said stem for limiting the operation of said valve in opposite directions, and a handle for operating said stem.

13. In a mixing device for tub and shower baths, a hollow body having a common mixing chamber provided with oppositely facing outlet openings, and having a valve chamber communicating with the mixing chamber and having openings for the inlet of cold and hot water, a valve rotatable in the valve chamber having ports adapted to register with said inlet openings for selectively supplying cold or hot, or both cold and hot water to the mixing chamber, a stem for operating said valve, an adjusting member adjustable in said body and supporting and guiding said stem, means carried by said stem and reciprocatable between said member and said valve for controlling the rotary movements of the valve, means for manually rotating said stem, and means for indicating step-by-step movements of the valve for dispensing cold, warm and hot water towards the tub and shower-head.

In testimony whereof I affix my signature.

ORVIS W. VALLIER.